R. C. JARVIS.
SPRING WHEEL.
APPLICATION FILED JUNE 1, 1910.

1,007,032.

Patented Oct. 24, 1911.

Witnesses:
Lester H. Palmer
Louis W. Gratz

Inventor:
Robert C. Jarvis
by Townsend Lyon & Hackley
his Attys.

UNITED STATES PATENT OFFICE.

ROBERT C. JARVIS, OF LOS ANGELES, CALIFORNIA.

SPRING-WHEEL.

1,007,032.     Specification of Letters Patent.     Patented Oct. 24, 1911.

Application filed June 1, 1910. Serial No. 564,517.

*To all whom it may concern:*

Be it known that I, ROBERT C. JARVIS, a citizen of the United States, residing at Los Angeles, in the county of Los Angeles and State of California, have invented a new and useful Improvement in Spring-Wheels, of which the following is a specification.

My present invention is especially designed for providing a metal spring wheel which will have a continuous flat tread in contact with the surface of a roadway, and such tread will be of uniform resiliency.

The object of my invention is to provide a spring wheel which will be strong and of uniform temper and resiliency.

My present invention is an improvement upon my invention in spring wheels for which I filed an application for Letters Patent in the United States Patent Office on December 12th, 1907, Serial No. 406,239.

My invention consists in providing a wheel having a felly and metal tire with a series of segmental metal springs, each spring comprising a pair of substantially V-shaped springs, one end of such V-shaped springs being slotted and held in engagement with the metal tire on the felly, and the other end of the V-shaped springs being riveted or otherwise suitably fastened to a spring tread portion, said spring tread portion being a segment of a circle.

The accompanying drawings illustrate my invention.

Figure 1:
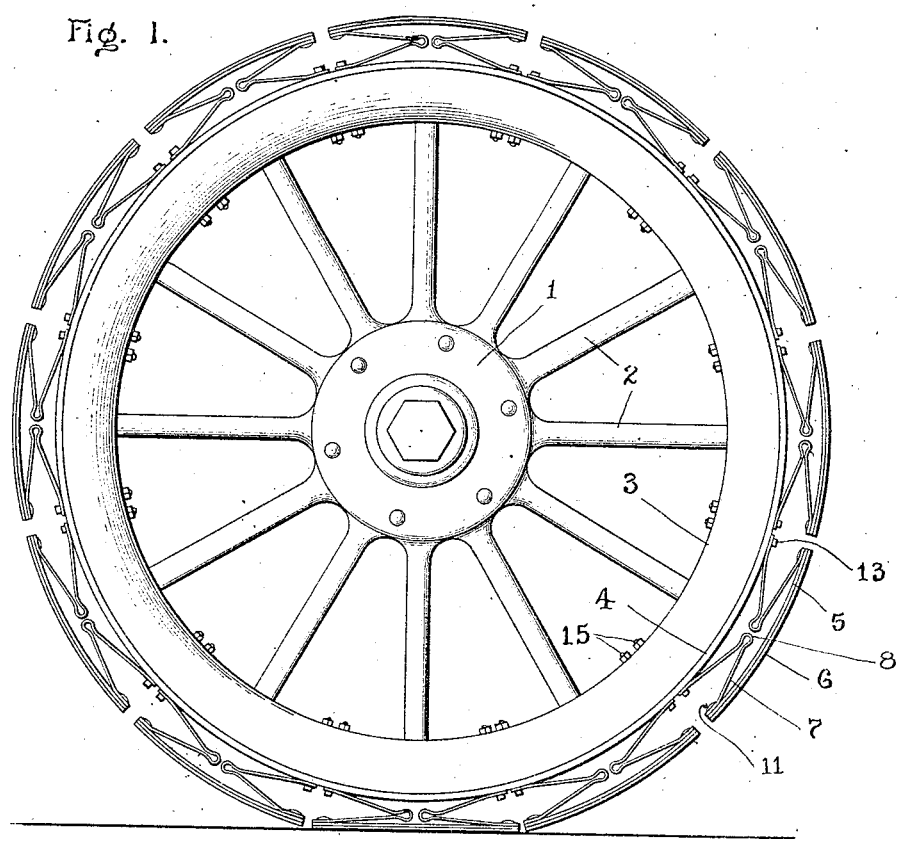
Figure 2:
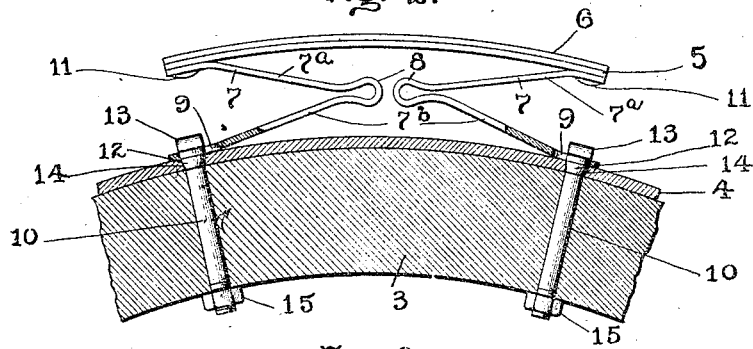
Figure 3:
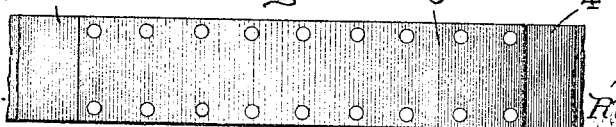

Figure 1 is an elevation of a wheel made in accordance with my invention. Fig. 2 is a longitudinal section of a fragment of the rim, tire and one of the spring segments. Fig. 3 is a plan view of the tread portion of one of the springs.

1 is the hub of a suitable wheel which is provided with spokes 2 and a felly 3. A metal tire or rim 4 is shrunk onto the felly 3 in the ordinary manner.

5 is the tread portion of the springs which is preferably faced with a pad 6 made of rubber or other suitable material.

7—7 are substantially V-shaped springs having a bend 8 at their middle forming thereby two leaves or members $7^a$ and $7^b$. The member $7^b$ is provided with a slot 9 at its end which bears upon the metal rim 4.

10—10 are bolts which pass through the felly, metal rim and the slot 9 of the leaf $7^b$ of the spring. The other end $7^a$ of the V spring is preferably fastened by a rivet 11 to one end of the tread spring 5 with the bent portion 8 projecting toward the midlength of the tread spring 5. The bolts 10 are provided with a taper 12 below the head 13, which tapered portion is seated in the counter-sunk holes 14 in the metal rim. The bolt head 13 is formed with two straight parallel sides and is arranged to be seated across the slot 9 to engage with the upper side of the spring and above the slot. Nuts 15 are provided for the screw ends of the bolts 10 to draw the taper 12 into the counter-sunk holes 14 in the metal tire. Such tapered counter-sunk holes are formed to permit the bolts to be drawn down to a predetermined distance which will allow the spring leaves $7^b$ to work freely on the metal rim 4 and be held in slidable engagement therewith by means of the bolts 10 and bolt heads 13.

In the manufacture of my improved wheel, the springs 7 are made by first punching a hole for the rivet 11 in one end and a slot 9 in the other end thereof while the metal is in flat form and before tempering, after which the blank is bent into the V form shown and is suitably tempered. The tread portion 5 is formed from an untempered piece of metal by punching holes at each end for the rivets 11, and if it is desired to employ a facing or pad, suitable holes are punched for the purpose of riveting or attaching such pads, after which the tread portion is bent to form a segment of a circle and the same is then heated and tempered. The formed and tempered V shaped springs are then riveted to the ends of the formed and tempered tread portion in the manner shown. Pads or cushions 6 may then be fastened to the outer face of the tread as shown if desired. The springs after being assembled in the manner described are mounted upon the tire 4 by means of bolts 10—10 passing through the slots 9 in the ends of the leaves $7^b$ and through the tire 4 and felly 3 with the taper portion 12 of the bolt seated in the counter-sunk hole 14, and the bolts are drawn down firmly in their seats by means of the nuts 15, care being taken that the head 13 is not brought into too close contact with the leaf end above the slot to prevent the leaf end from sliding freely upon the bolt and metal rim 4.

I have discovered that in order to provide a spring of uniform temper that the same must be of uniform thickness during the tempering process in order that the metal can be chilled uniformly after the same has been heated for tempering, and in order to provide a spring which will have a uniform temper and resiliency, I form such spring as described and thereby avoid bringing the metal of such spring into close contact with itself to increase the heat contained in any portion of the same during the tempering.

By means of the slots 9 in the ends of the leaves $7^b$ I provide means whereby the expansion of the two V shaped springs is compensated for and I thereby avoid any liability of breaking such springs by torsion.

When the tread portion of the different spring segments is brought into contact with the road surface it is flattened and is forced against the V shapel springs which in turn are compressed. The flattening of the tread portion lengthens it and the increase in length is taken up by the sliding of the leaf $7^b$ on the tire. This lengthening of the spring advances the ends of the tread portion toward the springs next to it and practically closes the gaps between the same, thereby forming a practically continuous flat tread for the wheel.

What I claim is:

1. In a spring wheel, a wheel having a tire, segmental springs spaced apart and mounted circumferentially upon such tire, such springs comprising a tread portion and two substantially V-shaped springs arranged between such tread portion and the tire, such V-shaped portions being provided at one end with a slot and being attached at its other end to the tread portion by a suitable fastening, and bolts passing through the slot in the V-spring and the tire.

2. In a spring wheel, a wheel having a tire, such tire being provided with countersunk holes spaced apart around its circumference, segmental springs spaced apart and mounted circumferentially upon such tire, such segmental springs comprising a tread portion and two substantially V-shaped spring portions between the tread portion and the tire, one end of such V-shaped springs being riveted to the tread portion and the other end being provided with a slot, a bolt having a head and a tapered portion below such head passed through the slot in the spring end and seated with its tapered portion in the counter-sunk hole in the rim.

In testimony whereof, I have hereunto set my hand at Los Angeles, California, this 27th day of May 1910.

ROBERT C. JARVIS.

In presence of—
P. H. SHELTON,
FRANK L. A. GRAHAM.